D. SMITH.
EXCAVATING ATTACHMENT FOR MOTOR VEHICLES.
APPLICATION FILED MAY 3, 1912.

1,059,227.

Patented Apr. 15, 1913.
4 SHEETS—SHEET 1.

D. SMITH.
EXCAVATING ATTACHMENT FOR MOTOR VEHICLES.
APPLICATION FILED MAY 3, 1912.

1,059,227.

Patented Apr. 15, 1913.
4 SHEETS—SHEET 2.

Witnesses
William Smith
John J. McCarthy

Inventor
Dudley Smith.
By Victor J. Evans
Attorney

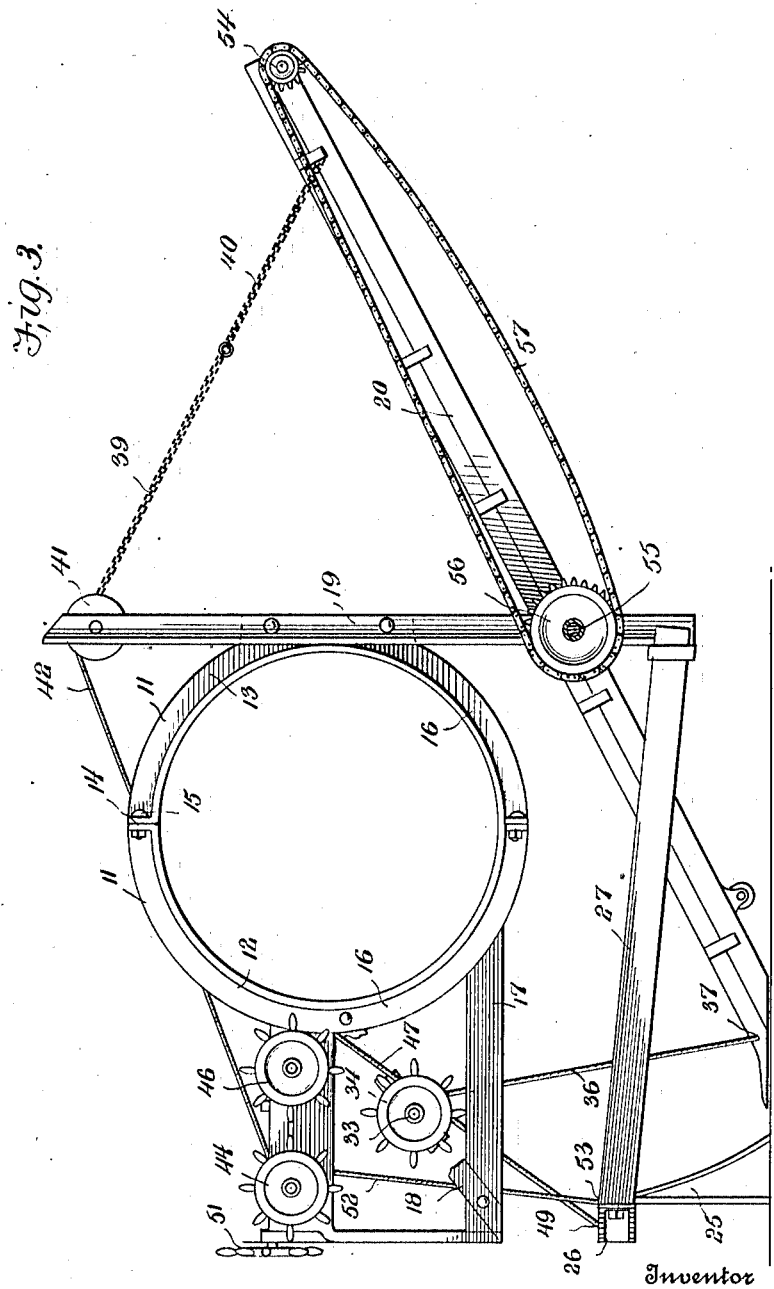

D. SMITH.
EXCAVATING ATTACHMENT FOR MOTOR VEHICLES.
APPLICATION FILED MAY 3, 1912.
1,059,227.
Patented Apr. 15, 1913.
4 SHEETS—SHEET 4.
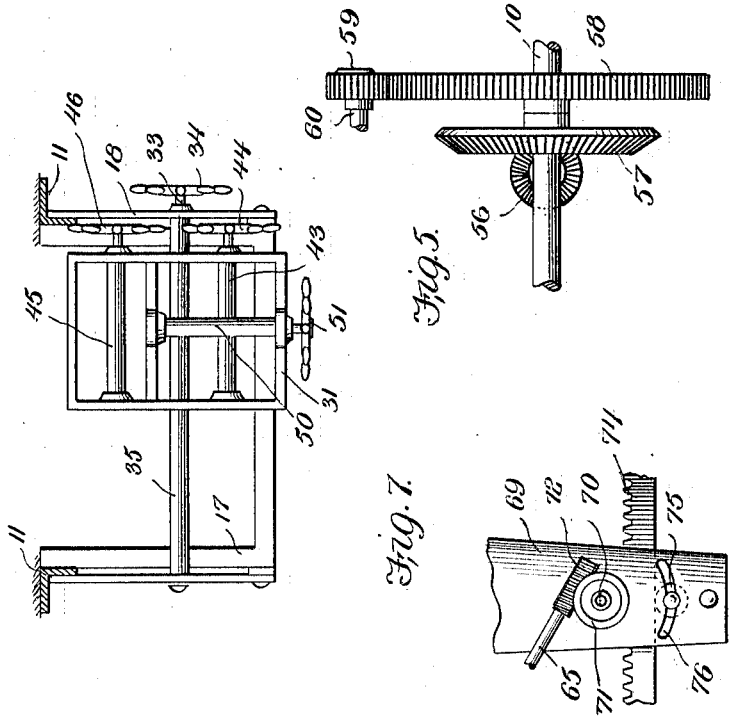
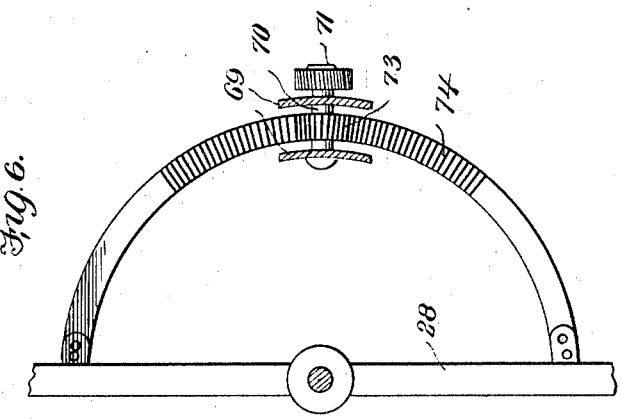
Witnesses
William Smith
John J. McCarthy
Inventor
Dudley Smith.
By Victor J. Evans
Attorney

UNITED STATES PATENT OFFICE.

DUDLEY SMITH, OF BENTON, ILLINOIS.

EXCAVATING ATTACHMENT FOR MOTOR-VEHICLES.

1,059,227.  Specification of Letters Patent.  Patented Apr. 15, 1913.

Application filed May 3, 1912. Serial No. 694,950.

*To all whom it may concern:*

Be it known that I, DUDLEY SMITH, a citizen of the United States of America, residing at Benton, in the county of Franklin and State of Illinois, have invented new and useful Improvements in Excavating Attachments for Motor-Vehicles, of which the following is a specification.

This invention relates to improvements in excavators or ditching and grading machines and has particular application to excavating and conveying attachments for self-propelled vehicles.

In carrying out this invention, it is my purpose to provide an excavating and conveying attachment which may be attached to and detached from a self-propelled vehicle, such as a traction engine, to enable such engine to be utilized for excavating purposes.

Furthermore, I aim to provide an attachment of the character described whereby a self-propelled vehicle, as a traction engine, may be converted into a ditching and grading machine, the excavating and conveying apparatus being detachably mounted upon the traction engine and driven therefrom to effect the excavating operation and enable the discharge of the material excavated into a suitable carrier, such as a wagon or the like.

Another object of the present invention, is the provision of an excavating and conveying device which shall embrace the desired features of simplicity, efficiency and durability coupled with cheapness of cost and manufacture and which may be attached to any well known or preferred form of self-propelled vehicle or traction engine without affecting the structure of such engine or necessitating an elaborate attaching mechanism.

With the above and other objects in view, the invention consists in the construction, combination and arrangement of parts hereinafter set forth in and falling within the scope of the claims.

Figure 1:
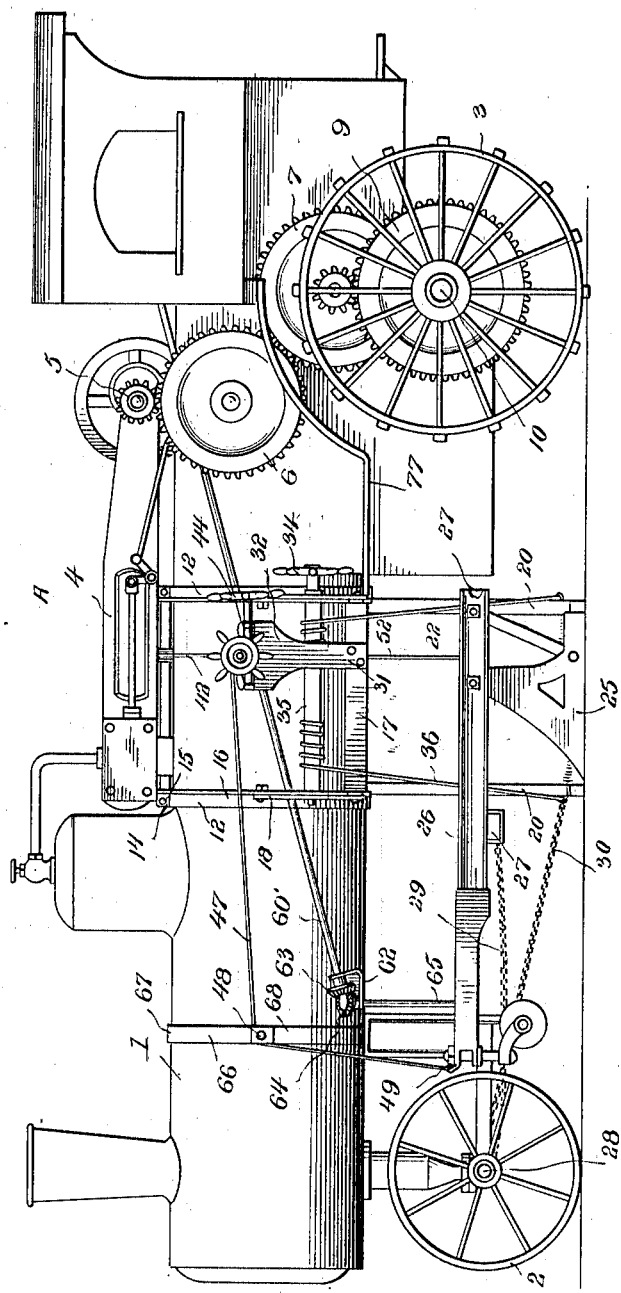
Figure 2:
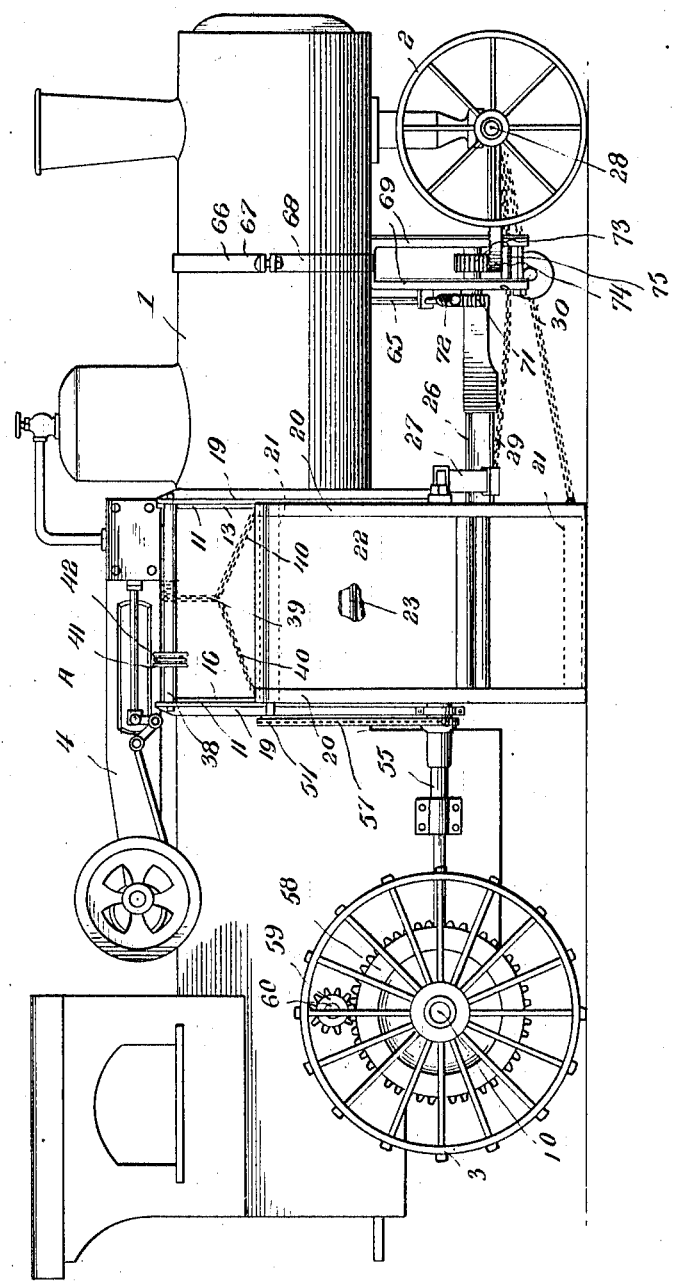

In the accompanying drawings there has been illustrated one preferred and practical embodiment of my invention, and in these drawings; Figure 1 is a side elevation of a traction engine equipped with the present invention. Fig. 2 is a similar view of the opposite side of the machine. Fig. 3 is a front elevation of the attachment removed from the vehicle. Fig. 4 is a top plan view of a detail of the invention. Fig. 5 is a detail view showing the gearing for driving the conveyer or elevator. Fig. 6 is a top plan view of a part of the steering mechanism of the vehicle. Fig. 7 is a view in elevation of a portion of the steering mechanism.

Similar reference characters designate like parts throughout the several views.

In carrying my invention into practice, I make use of an excavator, preferably a plow and an elevating conveyer preferably of the endless type in communication with the excavator and designed to receive the material, in the excavating operation, from the excavator and carry the same away from such excavator and deliver such material to a wagon or other vehicle. The excavator and conveyer are supported upon an attaching frame capable of attachment to and detachment from a self-propelled vehicle as a traction engine, the excavator being drawn by the vehicle and the elevating conveyer being driven from such vehicle in the grading or ditching operation. The opposite ends of the excavator and the conveyer are adjustable independently of each other and the excavator is adjustable independently of the conveyer to facilitate the excavating operation, the adjustment of the excavator and conveyer being preferably effected manually and by an operator upon the vehicle.

Referring now to the accompanying drawings in detail, A indicates a self-propelled vehicle shown in the present instance to be a traction engine equipped with a horizontal boiler 1, steering wheels 2 and the traction wheels 3, an engine 4 being mounted upon the boiler and in communication with the steam dome thereof and having driving connections with the traction wheels 3, such connections in the present instance consisting of a pinion 5 keyed to the crank shaft of the engine and meshing with a gear wheel 6 journaled upon a stub shaft supported within suitable brackets upon the boiler and meshing with a gear wheel 7 also secured to a suitable stub shaft to which latter is keyed a pinion meshing with a gear wheel 9 upon the rear axle 10 of the traction wheels.

Surrounding the boiler 1 preferably immediately in advance of the fire box thereof are a pair of spaced attaching rings 11, 11 each consisting of two sections 12 and 13 provided at their meeting ends with outturned lugs 14 formed with apertures alining with the apertures in the adjacent lug and adapted to receive fastening bolts 15. The lugs 14, 14 at the opposite extremities of the sections 12 and 13 of each ring 11 are preferably located diametrically of each other and at the top and bottom of the boiler, while the sections 12 and 13 of each ring 11 intermediate the lugs are outturned to provide supporting flanges 16. Bolted or otherwise secured to the flanges 16 of the sections 12 of the rings 11 upon one side of the boiler adjacent the bottom thereof and extending at a tangent thereto, is a horizontal supporting frame 17 supported at its outer end by means of brace rods 18 suitably fastened to the said end of the frame and to the flanges 16 of the sections 12 at an appropriate distance above the connections of the frame with such flanges, as clearly illustrated in Fig. 1.

Connected to the sections 13 of the attaching rings 11, 11 and the flanges 16 thereon, at the side of the machine opposite from the supporting frame 17, are a pair of uprights or standards 19 shown in the present instance to be of substantially L-shape in cross section, and pivotally mounted in the lower extremities of the standards 19, is an elevating conveyer composed in the present instance of a frame embracing spaced parallel side bars 20, 20 normally arranged at an angle to the vertical and carrying at their free extremities drums 21, 21 over which is trained an endless traveling conveyer belt 22, rollers 23 being arranged transversely of the bars 20, 20 and secured thereto intermediate the drums 21, 21 to form a bearing surface for the conveyer belt between the drums, as will be readily understood. The lower extremities of the side bars 20, 20, are preferably pivoted to the major portions of such bars so that the lower end of the elevating conveyer may be moved relatively to the upper end thereof and likewise the upper end moved relatively to the lower end so as to enable the conveyer to be adjusted to meet the exigencies of any particular case.

Mounted below the supporting frame 17, is an excavator 25 herein shown to be in the form of a plow, and this excavator is secured upon a beam 26 arranged longitudinally of the traction engine and pivotally connected to the lower extremities of the standards 19, 19 at the opposite side of the frame through the medium of cross bars 27, 27 located forwardly and rearwardly of the conveyer and extending transversely of the machine. The axle of the steering wheels 2 is indicated at 28 and as shown has connection with the forward cross bar 27 through the medium of a chain or the like 29 so as to center the draft of the excavator 25 in the ditching or grading operation. Likewise, the forward axle 28 is by means of a chain 30 connected to the lower extremity of the elevating conveyer so as to maintain the parts in normal operative position when working.

Rigidly secured to the supporting frame 17 and projecting upwardly therefrom is a vertical standard 31 equipped at its upper extremity with a head 32. Journaled in the brace bars 18, in the present instance, is a shaft 33 equipped with a hand wheel 34 and carrying a drum 35 to which is attached and trained over a chain, cord, rope, cable or the like 36 connected at its lower end to the pivoted portion of the elevating conveyer, as at 37. Thus, in the movement of the hand wheel 33 the lower portion of the elevating conveyer may be lowered or elevated as desired and according to the direction of movement of the hand wheel. Journaled in the upper extremities of the standards or uprights 19, is a drum 38 to which is fastened and trained over a chain or other flexible member 39 terminating in the branch portions 40, 40 connected to the opposite sides of the upper extremity of the frame of the elevating conveyer, and upon the shaft 38 is keyed a pulley 41 or the like to which is fastened and trained over a cable, cord or the like 42 extending across the top of the boiler to the opposite side of the machine and having its extremity fastened to and wrapped about a drum 43 journaled in the head 32 and equipped with a hand wheel 44. In the manipulation of the hand wheel 44 the drum 43 is rotated to impart movement to the drum 38 and consequently wind or unwind the chain 39 to elevate or lower the conveyer, according to the direction of movement of the hand wheel 44.

The forward and rearward extremities of the excavator supporting beam 26 are adjustable independently of each other, as aforesaid, and the said beam is also adjustable independently of the adjustment of the conveyer, and for this purpose a drum 50 is journaled upon the head 32 of the standard 31 and equipped with a hand wheel 51 and fastened to such drum 50 and wrapped thereabout is a flexible connection 47 such as a chain, cord, cable or the like trained over a guide sheave 48 fastened to a suitable or appropriate part of the boiler, the free extremity of the element 47 being connected to the forward end of the excavator supporting beam 26, as at 49. Likewise, journaled upon the head of the standard is a drum 45 provided with a hand wheel 46 and to the drum 45 is fastened and wrapped about a cable, cord or the like 52 depending from the drum and connected at its free extremity as at 53 to the rear end of the supporting beam. Thus, in the manipulation of the hand wheel 51, the drum 50 is rotated to wind or unwind the element 47 and consequently raise or lower the forward extremity of the beam 26, according to the direction of rotation of the drum, while the rear end of the excavator beam is raised and lowered by means of the drum 45 and hand wheel 46.

In order to drive the elevating conveyer, the drum 21 journaled in the upper extremities of the side bars 20, 20, is outwardly of one of said bars, provided with a sprocket wheel 54 and journaled in the lower extremity of standard 19 at the respective side of the conveyer, is a shaft 55 upon which is keyed a sprocket wheel 56 and over the sprocket wheels 54 and 56 is trained an endless chain 57 designed to impart movement to the elevating conveyer from the shaft 55. This shaft 55, is arranged longitudinally of the fire box of the engine as shown and at its free end is equipped with a beveled pinion 56 meshing with a similar gear 57 bolted or otherwise secured to a peripheral toothed gear 58 driven from a pinion 59 keyed upon one extremity of a shaft 60 and receiving power from the engine 4.

In practising the present invention, the steering wheels 2 of the engine are manipulated for steering purposes from the cab of the vehicle as usual and the mechanism thereof is constructed in such manner as to operate freely irrespective of the attaching of the excavator and conveyer to the vehicle. This steering mechanism preferably consists of an elongated shaft 60' designed to be passed through the attaching flange 16 on the sections 12 of the rings 11 and terminating at one extremity within the cab of the engine and equipped at such extremity with a steering wheel of any usual or preferred construction, while the opposite end of such shaft is journaled in a bracket 62 and has keyed thereto a beveled pinion 63 meshing with a similar pinion 64 keyed upon one end of a shaft 65 extending beneath the boiler and at an angle to the shaft 61 and having its gear carrying extremity journaled in the bracket 62. Surrounding the boiler in advance of the rings 11, 11, is a fastening ring 66 formed of two sections 67 and 68 each having its opposite extremity outturned to provide coupling lugs alining with the lugs in the adjacent section and apertured to receive fastening bolts or the like. Depending from the lower section of the rings 66 beneath the boiler, are transversely curved spaced parallel supporting strips 69 and between such strips at the lower extremities thereof is journaled a shaft 70 equipped at one end beyond the strips with a worm gear 71 meshing with a worm 72 upon the end of the shaft 65, while keyed to the shaft 70 intermediate the strips 69 is a toothed pinion 73 meshing with a crown gear segment 74 fastened at its opposite extremities to the steering axle 28 and held in engagement with the toothed pinion 73 by means of rollers 75 journaled in the free extremities of the strips 69 beneath the shaft 70. These rollers 75 are preferably journaled in arcuate shaped slots 76 so as to maintain the crown gear segment in engagement with the toothed pinion 73 at all times irrespective of the position of steering wheels of the vehicle, incident to such wheels engaging or contacting with irregularities in the roadway in their path of travel. Thus, upon manipulating the steering wheel of the shaft 61, motion will be imparted to the shaft 65 thence, by way of the worm 72 and worm gear 71, to the shaft 70 to actuate the pinion 73 and crown gear segment 74 to throw the steering wheels in the desired direction to change the path of travel of the vehicle. A platform 77 is fastened to the vehicle in proximity to the standard 31 to accommodate an operator.

From the foregoing description taken in connection with the accompanying drawings, the construction, mode of operation and manner of employing my invention will be readily understood by those skilled in the art to which the invention appertains, and while I have herein shown and described one particular form of my invention, it is to be understood that I do not limit or confine myself to the exact details of construction herein described and delineated, as modification and variation may be made within the scope of the claims and without departing from the spirit of the invention.

I claim:

1. In a grading or ditching machine, the combination with a self-propelled vehicle including a boiler, of attaching rings surrounding said boiler, uprights or standards secured to said rings at one side of the boiler and arranged in a vertical plane, an excavator, a conveyer pivoted between said uprights at the lower ends thereof and in communication with said excavator, a supporting frame carried by said rings at the opposite sides of the boiler, a plurality of drums upon said frame, and connections between the drums and the opposite ends of the conveyer and excavator whereby said conveyer and excavator may be elevated and lowered independently of each other.

2. In a grading or ditching machine, the combination with a self-propelled vehicle including a boiler, of attaching rings surrounding the boiler and each formed of a number of sections outturned to provide supporting flanges, standards secured to said flanges at one side of the boiler and arranged vertically, an excavator, a jointed conveyer pivoted between said standards at the lower ends thereof and in communication with said excavator, a supporting frame carried by said rings at the opposite side of the boiler, a plurality of drums upon said supporting frame, and connections between the drums and the opposite ends of the conveyer and excavator whereby each end of the conveyer and excavator may be elevated and lowered independently of the other end and the excavator and conveyer elevated and lowered independently of each other.

3. In a grading or ditching machine, the combination with a self-propelled vehicle including a boiler, of attaching rings surrounding the boiler, uprights secured to said rings at one side of the boiler and arranged vertically, an excavator, a jointed conveyer pivoted between said uprights at the lower ends thereof and in communication with said excavator, a supporting frame carried by said rings at the opposite side of the boiler, a standard upon said frame, a plurality of drums upon the standard, a drum journaled in the upper ends of said first standards, connections between the last-mentioned drum and one of the drums upon the last-named standard and between the second-named drum and the upper end of said conveyer whereby the drum on the free ends of the first-mentioned standards may be actuated to raise and lower the respective end of the conveyer, and connections between the remaining drums upon the last-mentioned standard and the opposite ends of the excavator and the free end of said conveyer.

In testimony whereof I affix my signature in presence of two witnesses.

DUDLEY SMITH.

Witnesses:
 JESSE R. SMITH,
 J. D. SMITH.

---

Copies of this patent may be obtained for five cents each, by addressing the "Commissioner of Patents, Washington, D. C."